July 10, 1951 R. C. DEHMEL 2,560,528
TRAINING MEANS FOR BLIND NAVIGATING SYSTEMS
Filed March 27, 1945 7 Sheets-Sheet 3

INVENTOR.
Richard C. Dehmel
BY
ATTORNEY

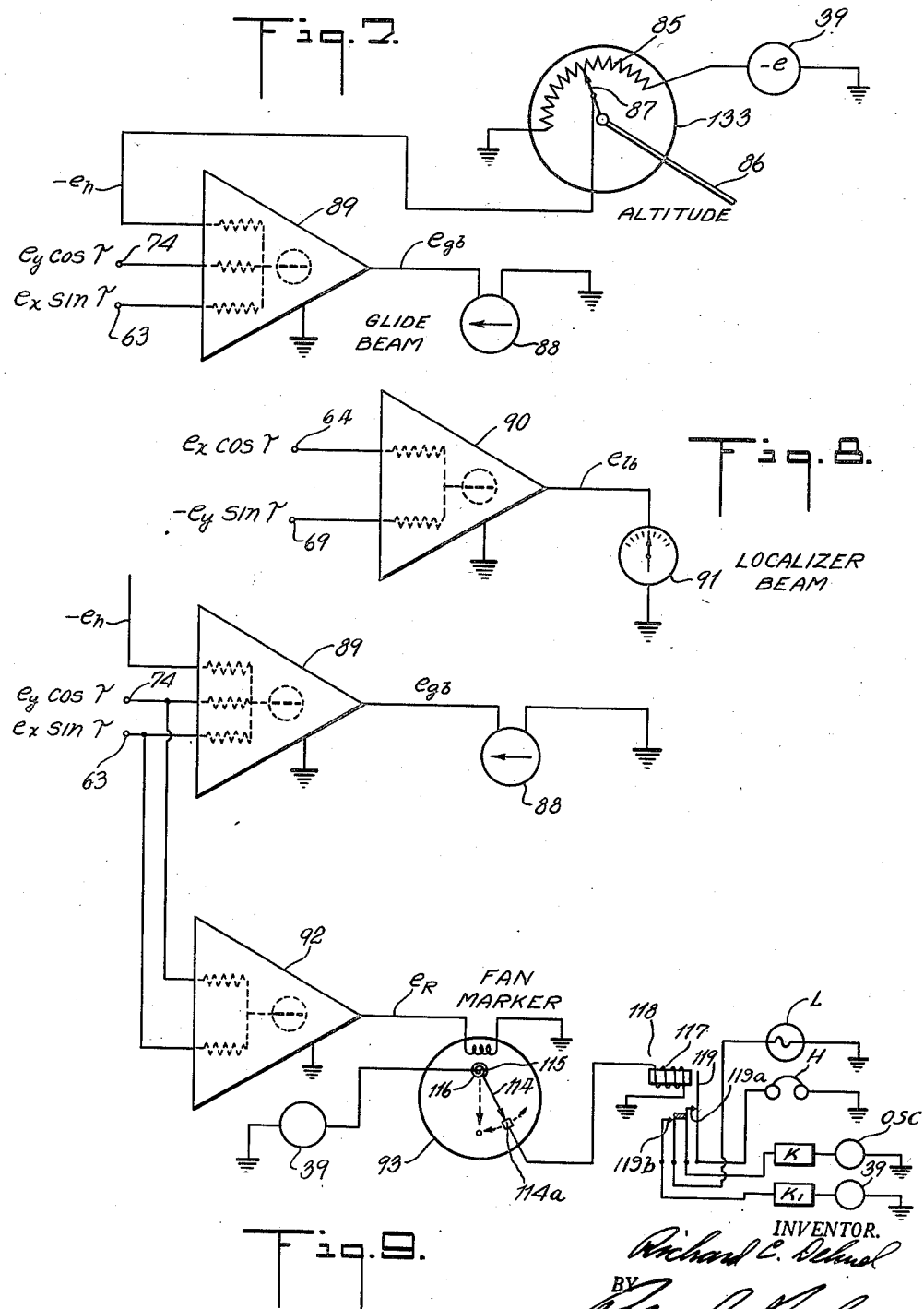

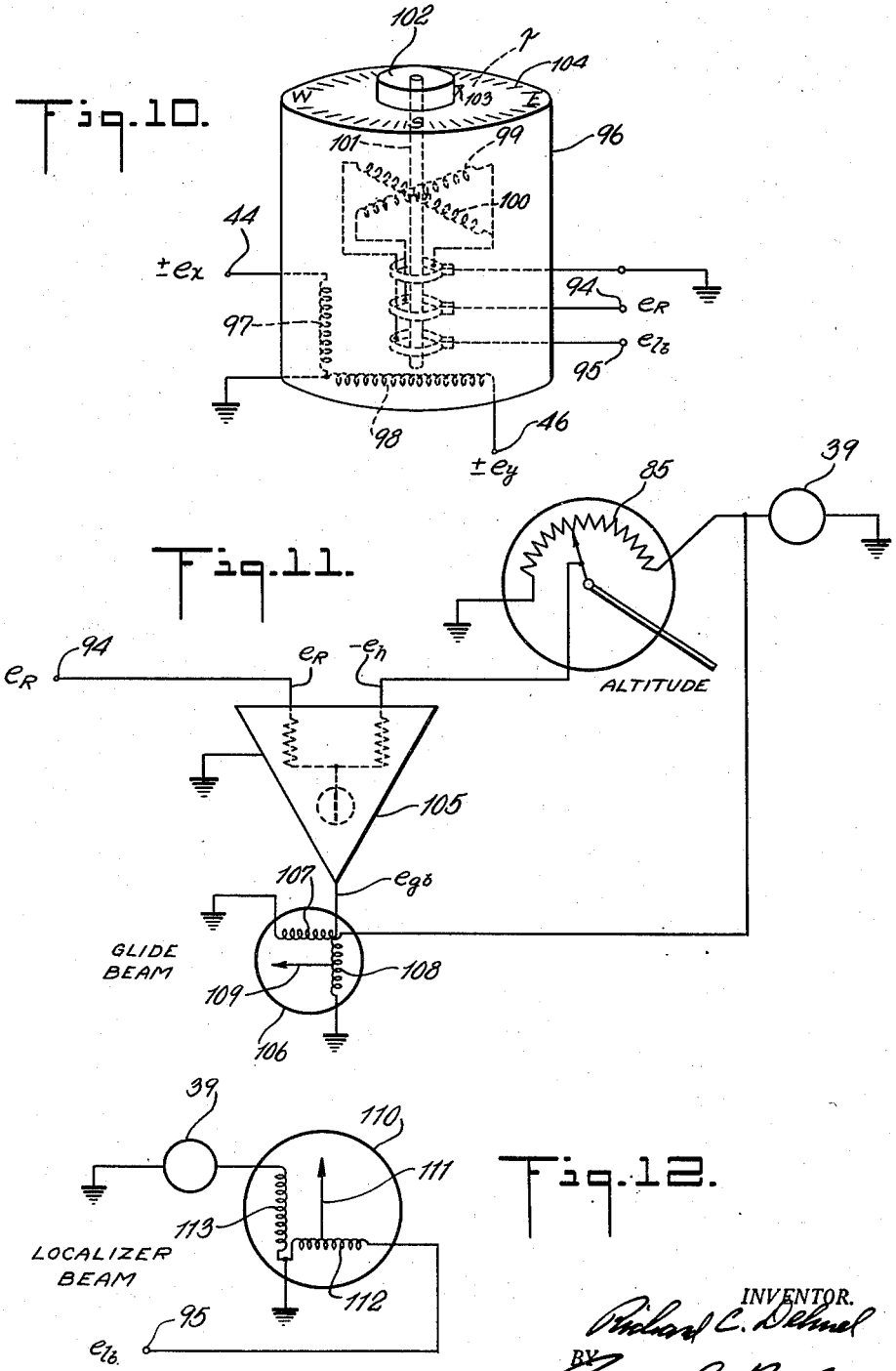

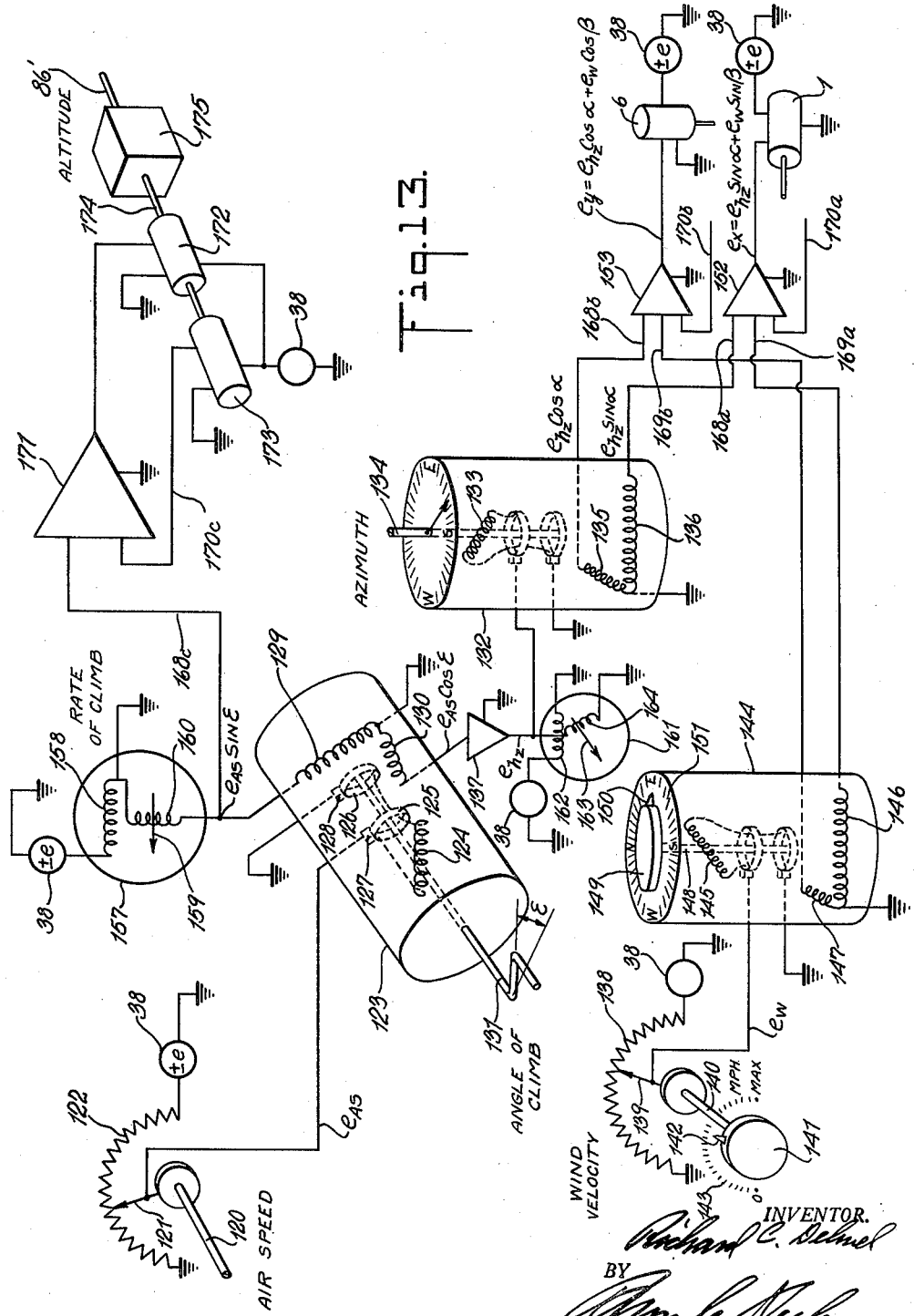

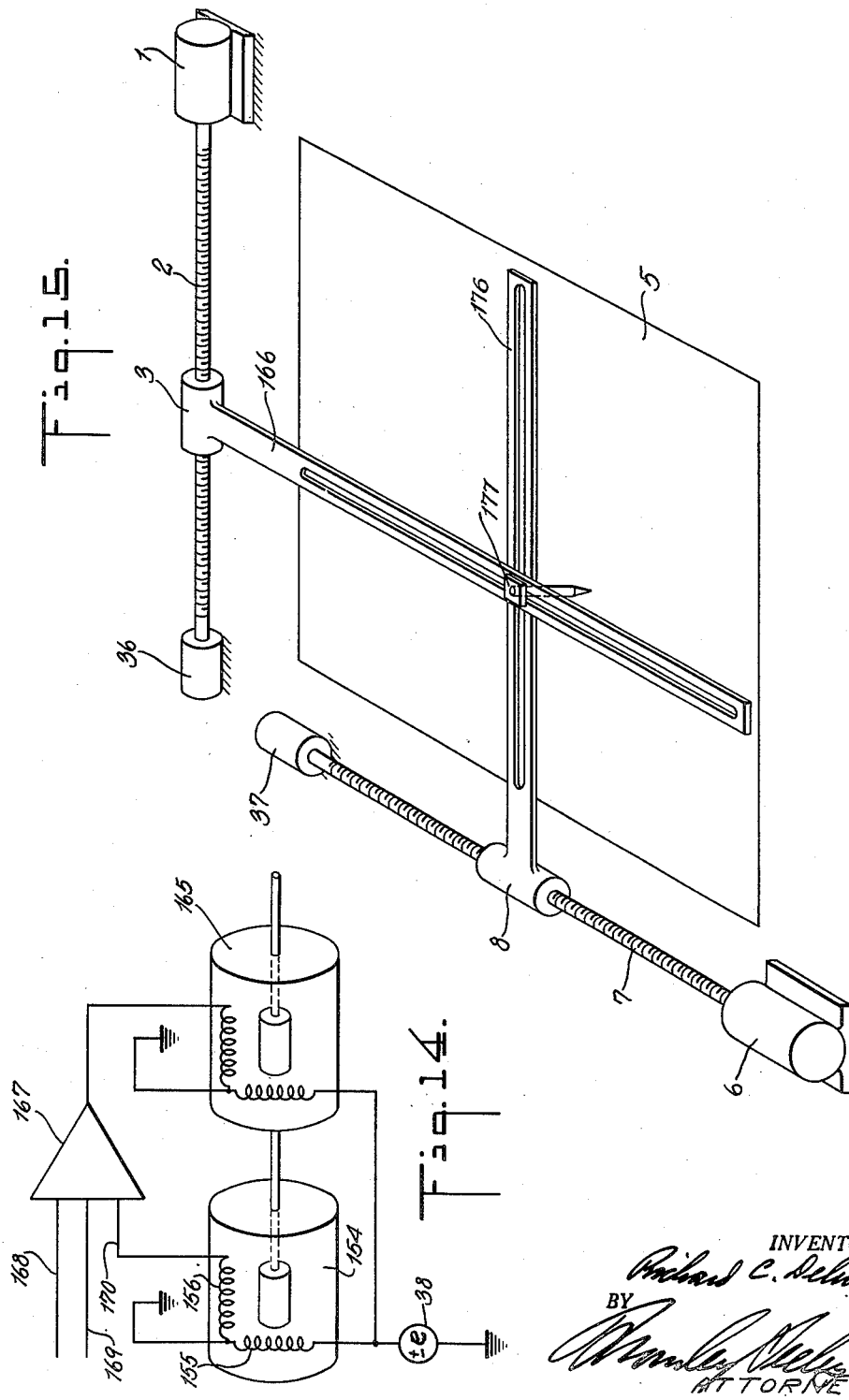

Patented July 10, 1951

2,560,528

UNITED STATES PATENT OFFICE 2,560,528

TRAINING MEANS FOR BLIND NAVIGATING SYSTEMS

Richard C. Dehmel, Short Hills, N. J.

Application March 27, 1945, Serial No. 585,102

30 Claims. (Cl. 35—10.2)

This invention relates to training apparatus for instruction in the use of blind navigating systems in which various types of craft are navigated entirely by the use of instruments and signals. Such a method of navigation is particularly useful under conditions of zero or low visibility such as fog or darkness, and an object of this invention is to provide an improved apparatus for instruction in methods of determining the distance and direction of an objective from a navigable craft.

An important use for apparatus of this type is the training of aircraft pilots in blind or instrument flying, and a further object of this invention is to provide an improved apparatus, adapted for use either in actual flight or in a ground trainer, for instruction in blind landing of aircraft.

Another object of this invention is the provision of a new method of and apparatus for simulating the electric pattern of a radio blind landing system; and for the operation of landing indicators in accordance with real or simulated flight maneuvers with respect to such pattern.

More specifically, a further object is the provision of improved glide and localizer beam simulating circuits for both aircraft and training apparatus.

A further object of this invention is the provision of a novel circuit having independently adjustable latitude and longitude devices and an independently adjustable direction device so that the choice of location or direction of the landing beams is not limited.

A further object of the invention is the provision of means for operating visual and audible fan marker signals according to changes in the above referred to range voltage.

A further object of the invention is improved blind landing simulating means operable from the air speed and direction indicating devices of an aircraft trainer.

A further object of the invention is improved flight path indicating apparatus and blind landing simulating means, each responsive to Cartesian coordinate parameters.

These and other features of the invention, such as new and novel features of construction and combination of parts, including electric circuits, will be more clearly understood by reference to the following text and drawings in which commercial embodiments of the invention are shown. It is to be clear, of course, that such illustrations are primarily for purposes of disclosure and that the structure may be modified in various respects without departure from the broad spirit and scope of the invention hereinafter defined and claimed.

Parts in the specification and drawings will be identified by specific names for convenience, but these are intended to be as generic in their application to similar parts as the art will permit.

Like characters of reference indicate like parts in the several figures of the drawings, of which:

Fig. 2a illustrates circuits of sine-cosine potentiometers used to resolve the Cartesian coordinate position voltages derived from the circuits of Fig. 2;

Fig. 3 illustrates the structure of the sine-cosine potentiometers illustrated schematically in Fig. 2a;

Fig. 7 is a schematic diagram of a circuit for operating in connection with Figs. 2 and 2a a glide beam indicator;

Fig. 8 is a schematic diagram of a circuit for operating in connection with Figs. 2 and 2a a localizer beam indicator;

Fig. 9 is a schematic diagram of a circuit for introducing in connection with Figs. 2 and 2a fan marker signals in a simulated blind landing system;

Fig. 10 is a schematic diagram of a rotary synchronous transformer that may be used in practicing this invention for resolving alternating-current voltages;

Fig. 11 is a schematic diagram of a circuit for operating in connection with the resolver of Fig. 10 a glide beam indicator from alternating-current range and altitude voltages;

Fig. 12 is a schematic diagram of a circuit for operating in connection with Fig. 10 a localizer beam indicator from an alternating-current voltage representing directional deviation;

Fig. 13 is a schematic diagram of a circuit for operating by alternating-current the blind landing system of my invention according to the air speed and heading of an airplane or grounded training apparatus, and for introducing the effects of wind drift;

Fig. 14 is a diagrammatic illustration of a motor-generator set used as driving means for operating apparatus shown in Fig. 2; and Fig. 15 is a diagrammatic view of apparatus for charting the flight path of a craft during maneuvering and landing.

Figure 1:
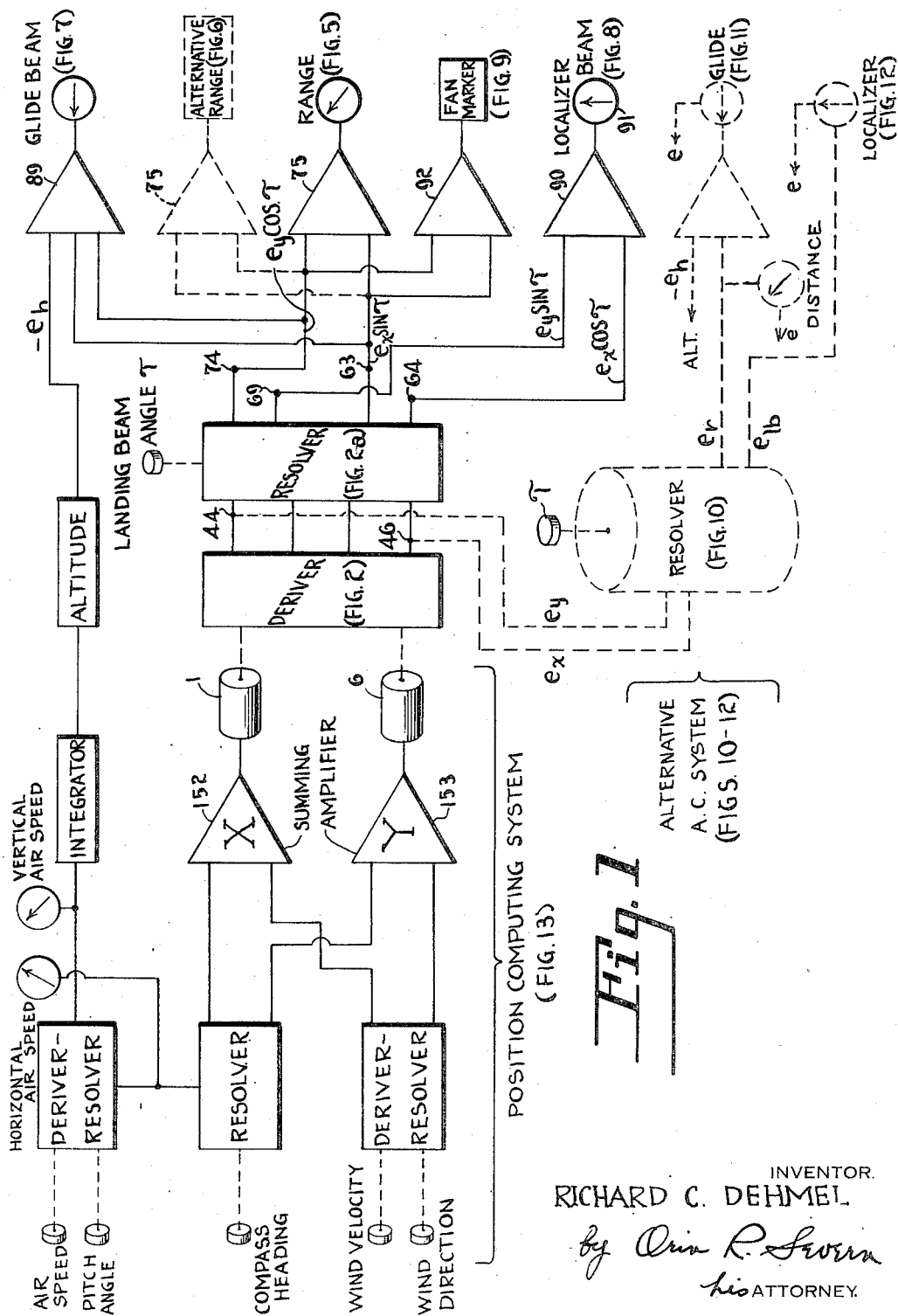
Fig. 1 shows schematically in flow-chart form, the general relationship of component parts of the present invention.

This invention is not only applicable to aviation training devices, but may also be used in connection with training aids for instructing pilots in the navigation of air, land and water craft, or any other conveyance or structure having actual or simulated motion with respect to a radio or radar beam transmitted or reflected from an object for indicating the position of said conveyance with respect to the object.

The apparatus of my invention may be installed in an actual airplane and the position voltage deriving means may be actuated manually by an instructor or automatically by means responsive to the altimeter, air speed indicator and direction instrument of the aircraft. When so installed, practice may be given student pilots in making blind landings under actual flying conditions while utilizing any airport or landing strip.

The use of the invention with grounded aviation training devices is not to be limited to any particular type of trainer, as it may be adapted for use with electrically, fluid or mechanically operated training devices which may be stationary, pivoted or mobile. For example, the invention may be used with apparatus of the character shown in my Patent No. 2,366,603 granted January 2, 1945, for "Aircraft Training Apparatus" which discloses a pilot's station and a flight instrument panel on which apparatus and instruments of the present blind landing system may be mounted respectively.

The signaling beams which are simulated by the operation of my invention may represent a radio beam, or the transmitted and reflected beams of a radar located either in the craft or at a remote position.

The apparatus of the present invention utilizes the motion of two elements moved in accordance with the respective instant Cartesian position coordinates of the real or simulated craft with respect to a reference point. This point may, for example, be the spot at which a landing is to be made.

In the following specification and claims, the phrase "landing facility" or "guiding facility" is to be taken as meaning a landing spot or area, an objective and/or a radio beam or radio transmitter and the like. In the claims and specification where a reference axis, axes or a reference point is referred to, such axis, axes or point is intended to be a mathematical concept and not a physical element, line or point. Wherever a flight path indicating element or course charting element is referred to, such elements as a pointer for providing momentary indication of a position or a pen for recording a trace are to be regarded as being within the intended meaning.

In a specific form of the invention three voltages are derived representing respectively such Cartesian position coordinates as latitude, longitude and altitude of the aircraft with respect to a selected landing point or objective, and these position voltages are resolved into two other voltages representing respectively the deviation of the aircraft from a glide beam and a localizer beam. The voltages representing the instant latitude and longitude of the aircraft with respect to the landing point are used to energize a resolver to derive voltages corresponding to the instant distance or range and direction of the aircraft from said landing point. These resultant voltages in combination with the altitude voltage derived from height designating apparatus of the aircraft or trainer, actuate a glide and localizer beam indicator showing deviation from the azimuthal position of the landing approach path.

The term "azimuth" as used herein for describing the desired approach path of the aircraft to the objective indicates the direction bearing angle of the approach path, or the radio landing beam with respect to the reference direction, as distinguished from the pitch or glide angle of approach of the aircraft. This azimuth angle may be determined by the instructor by adjusting suitable resolving apparatus according to the azimuth angle selected for the approach.

In my copending application S. N. 511,732 for "Navigation Apparatus for Aircraft and Training Devices" filed November 25, 1943, there is disclosed and claimed means for obtaining coordinate voltages representing the instant position of a craft with reference to a Cartesian coordinate system. This application has matured into Patent No. 2,475,314 dated July 5, 1949. For following the craft position, motive means responsive individually to said voltages are used to operate apparatus representing said instant coordinate positions.

Accordingly, it is unnecessary in the present application to duplicate this disclosure to show means for moving apparatus so as to represent the instant position coordinates of a moving craft. The present invention, however, is not limited to the specific apparatus disclosed in my aforesaid application for obtaining position coordinates and any suitable means for accomplishing this result may be used.

The invention is shown generally in outline by the flow-chart diagram of Fig. 1 wherein voltage deriving and resolving apparatus is indicated as controlled according to a number of simulated flight conditions including airspeed and compass heading, wind velocity and direction, and the simulated pitch angle of the airplane. The airspeed and wind values which are represented by voltages are resolved into Cartesian coordinate components in a horizontal plane, the X components being separately summed and the Y components also being separately summed by the respective amplifiers so indicated. Horizontal and vertical airspeed can, if desired, be indicated according to the horizontal and vertical velocity components resolved from pitch angle. The summed X and Y voltages operate respectively the integrating motors 1 and 6 which in turn control voltage deriving means for obtaining Cartesian coordinate position voltages representing the instant coordinate position of the aircraft in the X—Y plane. These position voltages, which may be either D. C. or A. C. depending on the system selected, are then resolved according to the desired azimuthal landing approach to the objective or facility represented for obtaining control voltages which in turn are used, in certain instances in combination with a voltage representing altitude of the flight position, for operating simulated glide and localizer beam indicators, range or distance indicators and fan markers.

Figure 2:
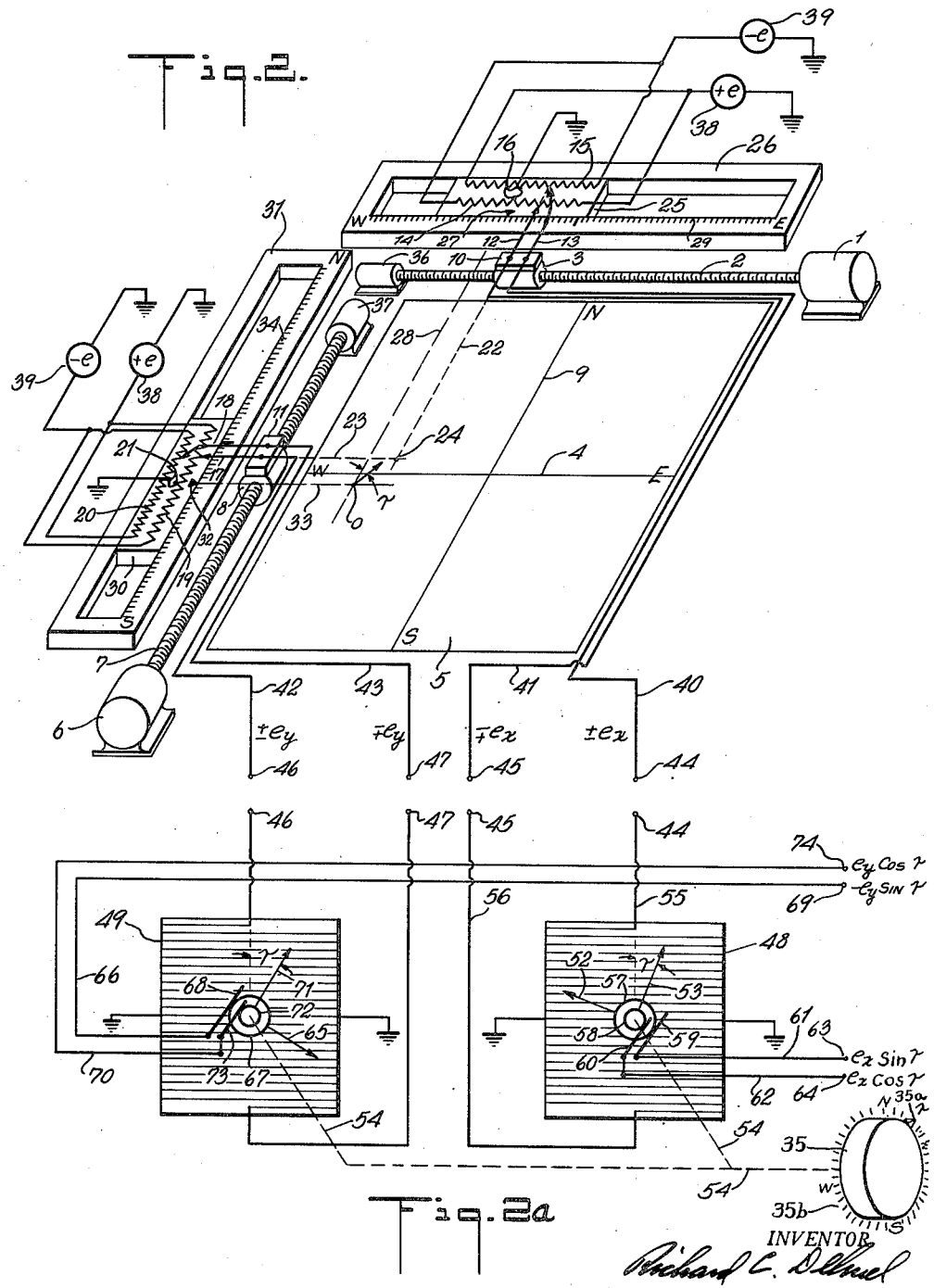
Fig. 2 is a partly diagrammatic view of an electro-mechanical system embodying the invention used to derive voltages corresponding to Cartesian ground position coordinates of a craft or training apparatus with respect to a landing point or objective.

Referring to Fig. 2, motor 1, or any other suitable motive means or driving device is used as rate integrating means to rotate the lead screw 2 at a speed proportional to the component velocity of the craft in the east-west direction so as to move the lead screw nut 3 in accordance with the instant Cartesian position coordinate of the craft along the east-west axis 4 indicated on the chart 5. Similarly, the rate integrating motor 6 rotates the lead screw 7 at a speed proportional to the component velocity of the craft in the north-south direction so as to move the lead screw nut 8 in accordance with the instant Cartesian position coordinate of the craft along the north-south axis 9. The outer ends of the lead screws are supported by journals 36 and 37.

Insulating blocks 10 and 11 are attached to and carried by the nuts 3 and 8, respectively. Attached to the insulating element 10 are the potentiometer contacts 12 and 13. The contact 12 selects a voltage $\pm e_x$ from a potentiometer winding 14, and the contact 13 selects a voltage $\mp e_x$ from a potentiometer winding 15, both voltages having potential as a parameter which varies in accordance with the lateral position of nut 3 with respect to the grounded points 16 of the windings 14 and 15. In a similar manner contacts 17 and 18 are mounted on the insulating element 11. Contact 17 selects the voltage $\pm e_y$ from potentiometer winding 19 and contact 18 selects a voltage $\mp e_y$ from potentiometer winding 20, both of these selected voltages having potential as the parameter which varies in accordance with the position of nut 8 with respect to the grounded points 21 of windings 19 and 20. Other parameters of the voltages $e_x$ and $e_y$ which vary with the position of nuts 3 and 8 with reference to the corresponding direction axis are the amperages in the associated circuits and the R. M. S. values of the currents and potentials of said circuits.

In Fig. 2 the dotted line 22 on the chart 5 represents a projection of a line through the contacts 12 and 13 where they contact the potentiometer windings 14 and 15. Likewise, the dotted line 23 represents the projection of a line through the contacts 17 and 18 where they contact the potentiometer windings 19 and 20. The lines 22 and 23 are mutually perpendicular and their intersection at 24 indicates the position of the craft at any instant with respect to the Cartesian coordinate reference axes 4 and 9.

For a purpose presently to be described, the potentiometers 14 and 15 are mounted in a block or support 25 which is slidably adjustable in the fixed frame 26 along its longitudinal axis. An index 27 is affixed to the block 25 in alignment with the projection line 28 of the ground connections 16. The index 27 registers with a scale 29 inscribed on the fixed frame 26, said scale 29 indicating the Cartesian position coordinate of index 27 along axis 4. Likewise, potentiometers 19 and 20 are mounted in block support 30 which is also slidably adjustable in the fixed frame 31. An index 32 is affixed to block 30 in alignment with the projection line 33 of the potentiometer ground connections 21. This index registers with a scale 34 inscribed on the fixed frame 31 and indicates the Cartesian position coordinate of index 32 along axis 9.

It is also to be noted that the instant longitude Cartesian position coordinate of nut 3, and thereby point 24, is given by the reading on scale 29 at the point of intersection of contact 12 with said scale 29. Similarly the latitude Cartesian position coordinate of nut 8 and point 24 is given by the reading on scale 34 at the point of intersection of contact 17 and said scale 34.

The opposite ends of the windings of each of the potentiometers 14, 15, 19 and 20 are energized by voltages of opposite polarity herein designated as $+e$ and $-e$. These voltages are respectively derived from the positively polarized direct current power sources generally indicated at 38 and the negatively polarized direct current power sources at 39.

The positions of the ground or zero potential connections 16 and 21 of the potentiometers 14 and 15, and, 19 and 20, designate the position of the origin O of the glide and localizer beams to be simulated. A change in the zero potential positions represents a change in the origin position O. Accordingly, the block 25 is adjusted in frame 26 until the position of index 27 is at the desired longitude of the landing point O, and likewise, block 30 is adjusted in frame 31 until index 32 is at the desired latitude of said landing point O. The voltages $e_x$ and $e_y$, derived as described above, therefore represent the instant Cartesian position coordinates of the moving craft with reference to the landing point O.

The potentiometer contacts 12, 13, 17 and 18 are connected respectively to wires 40, 41, 42 and 43 of Fig. 2 and transmit the position voltages $\pm e_x$, $\mp e_x$, $\pm e_y$ and $\mp e_y$ to terminals 44, 45, 46 and 47 respectively. (These terminals connect to the corresponding numbered terminals of Fig. 2a.)

If the angle $\tau$ indicated on the chart 5 represents the direction bearing of the localizer beam from the landing point O, voltage resolving means as shown in Fig. 2a may be employed to derive voltages indicative of the instant distance of a craft from point O and the deviation of said craft from the on-course plane of the localizer beam.

The cosinusoidal potentiometers 48 and 49 (of Fig. 2a) are a particularly convenient type of voltage resolver. The construction of these potentiometers is shown in detail in Fig. 3. While potentiometer 48 has been selected for the illustration in Fig. 3, the construction of potentiometer 49 is substantially the same except for the configurations of the brushes which differ as described later.

Figure 3:
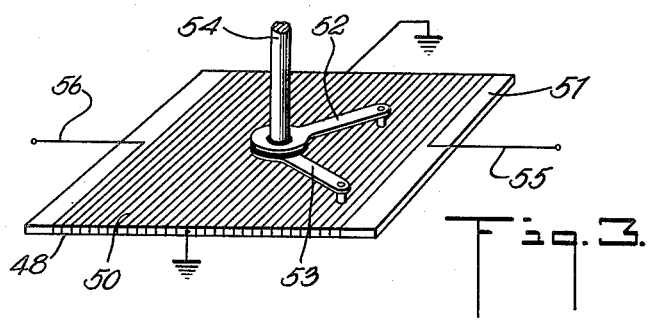

The sine-cosine potentiometer of Fig. 3 has a winding 50 which circumscribes a thin dielectric card 51. The insulation is removed from the wire at the upper surface of the winding and two contacts 52 and 53 mounted on and insulated from the shaft 54 are provided for engagement therewith. These contacts are positioned 90° apart and when a potential is applied across the terminal conductors 55 and 56 of the winding at the mid-points of opposite sides of the card, the adjacent sides being grounded at the mid-points thereof as indicated, the potential at the point of engagement of one contact with the winding will vary in accordance with the sine of the angle which that contact makes with the terminal position 55 and the potential at the point of engagement of the other contact with the winding will vary in accordance with the cosine of the angle. It is to be noted that while the resistance distribution of the winding 50 is uniformly distributed along the card 51, it varies (transcendentally) in distribution with the angle of rotation of contacts 52 and 53.

Referring again to Fig. 2a, the contacts 52 and 53 are connected to slip rings 57 and 58, respectively, which are provided with brushes 59 and 60 to transmit the potentials $e_x$ sine $\tau$ and $e_x$ cosine $\tau$ respectively from contacts 52 and 53 to the leads 61 and 62 connected to terminals 63 and 64 respectively.

Similar slip rings 67 and 72 and contacts 65 and 71 are provided for the potentiometer 49. The contacts of potentiometers 48 and 49 are simultaneously adjusted by a knob or dial 35, through shafting indicated at 54 to any desired landing beam angle $\tau$. The pairs of contacts 52, 53 and 65, 71 are secured to the shaft 54 so that the contacts 53 and 71 are in angular alinement and the contacts 65 and 52 are 180° apart as shown. For convenience in setting the angle $\tau$, the knob 35 carries an index 35a which registers on a fixed direction scale 35b.

The sine terminal lead 66 connects to potentiometer contact 65 through slip ring 67 and brush 68, the voltage appearing on terminal 69 being $-e_y$ sine $\tau$. Terminal lead 70 connects to cosine contact 71 through slip ring 72 and brush 73 so that a voltage $e_y$ cosine $\tau$ will appear on terminal 74. To derive the negative value of $e_y$ sine $\tau$ the sine contact 65 of potentiometer 49 is displaced 180° from the position of the sine contact 52 of potentiometer 48.

From the geometry of the system it can be shown that when the craft is on-course a voltage $e_R$ corresponding to the range of the craft from the point O will be represented by:

$$\overset{(63)}{e_R = e_x \text{ sine } \tau} + \overset{(74)}{e_y \text{ cosine } \tau} \quad \text{Equation 1}$$

and since the craft is on-course $$\overset{(64)}{e_x \text{ cosine } \tau} = \overset{(69)}{e_y \text{ sine } \tau} \quad \text{Equation 2}$$

Hence let $e_{lb}$ be a voltage representing the deviation of the craft from the on-course vertical plane of the landing system or localizer beam. Then, when the craft is on-course, $e_{lb}$ is zero as shown by the expression $$e_{lb} = e_x \text{ cosine } \tau - e_y \text{ sine } \tau = 0 \quad \text{Equation 3}$$

Equation 1 requires the addition of the voltages $e_x$ sine $\tau$ and $e_y$ cosine $\tau$. This is accomplished by the summing amplifier generally indicated at 75, Fig. 5. This amplifier may be, for example, of the type disclosed in Fig. 4. Since amplifiers of this type are well known in the art, a general description thereof is sufficient for the purpose of this invention.

Figure 4:
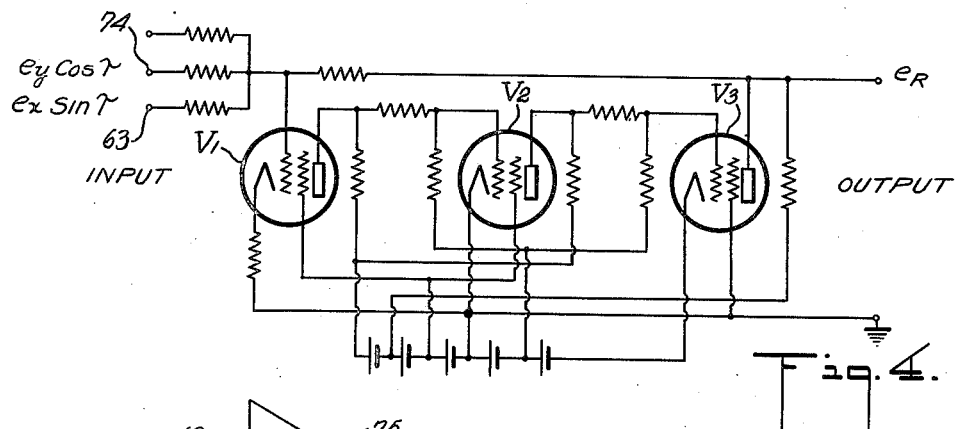
Fig. 4 illustrates one form of summing amplifier circuit which may be employed in the practice of this invention.
Figure 5:
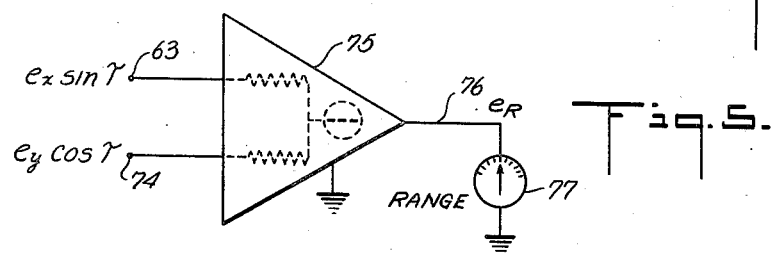
Fig. 5 is a schematic diagram of a circuit for operating in connection with Figs. 2 and 2a range indicating apparatus.

A three-stage direct coupled amplifying circuit is disclosed in Fig. 4 having tetrode or screen grid valves $V_1$, $V_2$ and $V_3$. The control grid of valve $V_1$ is connected as illustrated to the intput voltage terminals through suitable resistances. By way of example, two of the terminals are represented as connected to the terminals 63 and 74 of Fig. 2a. Therefore, voltages $e_x$ sine $\tau$ and $e_y$ cosine $\tau$ appear at these terminals respectively, and the resultant voltage $e_R$ appears at the plate or output circuit of valve $V_3$. This use of the amplifying circuit corresponds to that shown by Fig. 5 wherein the amplifier is indicated at 75.

Where the input voltages to be summed include another voltage, such as a voltage $-e_h$ representing altitude, a third branch circuit connection as indicated can also be connected to the control grid of valve $V_1$. Such use corresponds to that shown by Fig. 7 wherein the amplifier is indicated at 89.

It will be understood that the input terminals of the circuits illustrated by Figs. 5-9 inclusive are connected to the correspondingly marked terminals of Fig. 2a. The output voltage $e_R$ of the summing amplifier 75, Fig. 5, appearing on lead 76 may be used to actuate a meter 77 to directly indicate the distance or range of the craft from the landing point O.

Figure 6:
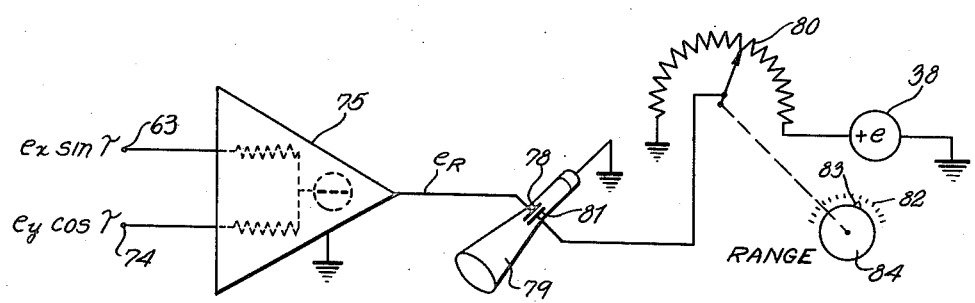
Fig. 6 is a schematic diagram of a circuit for operating in connection with Figs. 2 and 2a an alternative form of range determining indicator.

An alternative method of operating a range indicator is shown in Fig. 6 wherein the range output voltage $e_R$ of the amplifier 75 is impressed on the plate 78 of a cathode ray oscilloscope tube 79, and a variable voltage derived from a potentiometer 80 which is energized by a power source 38 is impressed on the balancing plate 81 of said oscilloscope. The point of balance of the potentiometer 80 (as read on scale 82 opposite the index 83 on potentiometer adjusting dial 84) is a measure of the range $e_R$. In this manner radar range finding apparatus may be simulated in an aircraft trainer.

Very frequently it is desirable to simulate a glide beam for instruction purposes in an aircraft simulating apparatus or in an airplane. For this purpose a circuit is provided as shown in Fig. 7 which uses the above derived range voltage in combination with an altitude voltage to operate either a cross-pointer indicator of conventional design or an oscilloscope tube for indicating the position of the actual or simulated airplane with respect to the glide beam of a blind landing system.

For an aircraft to remain steadily on the glide beam of a blind landing system such as a beam radiated at an upward inclination from landing point O, Fig. 2, it is necessary that a continual change be made in the altitude of the aircraft as it approaches or recedes from the point O. Hence, in the simulation of a glide beam apparatus for training purposes it is necessary to correlate the altitude indication of the aircraft or trainer with the instant distance from the landing point O. This correlation is provided as shown in Fig. 7 by mounting a potentiometer 85 on the altitude designation shaft 86 which may be suitably actuated by the altitude determining apparatus of the aircraft or trainer. The shaft 86 may be, for example, the shaft of an altimeter. The contact 87 engaging the winding of the potentiometer 85 is mounted on and insulated from the shaft 86 and is positioned in accordance with the actual or simulated altitude above the level of landing point O, Fig. 2. The potentiometer is energized from a source of power 39 oppositely polarized to the normal values of $e_y$ cosine $\tau$ and $e_x$ sine $\tau$.

If the aircraft is descending to point O, it will be clear that as $e_R = e_y$ cosine $\tau + e_x$ sine $\tau$ decreases, the altitude also decreases. Hence, if the distribution of resistance along winding 85 is such as to give a uniform increment of voltage change at contact 87 with each altitude increment, a voltage $-e_h$ exactly equal and opposite to the range voltage $e_R$, will be derived from the contact 87 when a straight glide is followed which has the proper altitude for each instant range position. If the three voltages $e_y$ cosine $\tau$, $e_x$ sine $\tau$ and $-e_h$, derived as described above, are impressed on the input of the summing amplifier, as indicated by Fig. 4, the output voltage $e_{gb}$ of said amplifier (Fig. 7) will be zero when the craft is on-course, whereas if the craft deviates from the on-course path of the glide beam, the deviation voltage $e_{gb}$ will deflect meter 88 from its horizontal or zero deviation position in the direction and to the extent that the craft is off-course.

As above described, if a straight line glide or descent path is desired, the resistance distribution of the winding of potentiometer 85 is made such as to provide a linear voltage change with altitude at contact 87. However, if a curved glide path is desired, the form holding the winding of potentiometer 85 may be contoured to provide a resistance distribution on the potentiometer which will give a nonlinear such as a cosinusoidal voltage change at contact 87 with variation in altitude.

If desired, the output voltage $e_{gb}$ from amplifier 89 may be impressed on the deflection plates of a cathode ray oscilloscope in the manner previously indicated, or any other form of electrically operated aircraft position indicating apparatus.

To actuate a localizer beam indicator the circuit of Fig. 8 is provided wherein the voltage $e_{lb}$ of Equation 3 representing azimuthal deviation from the localizer beam is obtained by summing the component voltages $e_x$ cosine $\tau$ appearing on terminal 64, Fig. 2a, and $-e_y$ sine $\tau$ appearing on terminal 69 of the resolving apparatus. This summation is accomplished in the summing amplifier 90, Fig. 8, the output voltage $e_{lb}$ of which is impressed on the localizer beam indicating meter 91. When the aircraft is directly on-course with respect to the localizer beam, the voltage $e_{lb}$ according to Equation 3 is zero and the meter 91 remains undeflected from its vertical or zero position. Deflection of meter 91 to either side indicates a corresponding azimuthal angular deviation of the aircraft from the localizer beam or approach path. Thus, the operation of the meter or indicator 91 is in response to a deviation voltage that is obtained from the summing amplifier 90 according to the energization and azimuthal adjustment of the resolving apparatus of Fig. 2a.

One or more fan markers are generally associated with a blind landing beam system at given distances from the point O, Fig. 2. Signals corresponding to these markers may be automatically introduced by the circuit of Fig. 9 in which the range voltage $e_R$ is derived from the summing amplifier 92. The said voltage $e_R$ is impressed on a D'Arsonval contactor mechanism 93 having a contactor arm 114 which is deflected to an extent proportional to the instant range of the craft from point O. The dotted line position of arm 114 represents zero range, i. e. when $e_R$ is zero. The coacting contact 114a is adjustable circumferentially as shown by the direction arrows about the pivot 115 of arm 114 in accordance with the desired range of the marker beacon from the point O. When the value of $e_R$ is large the contact 114 is deflected counter-clockwise through a large angle with respect to the zero position and as the range decreases to a predetermined amount contact 114a is engaged and a circuit is closed through the power source 39, spring 116, contacts 114 and 114a and the winding 117 of relay 118. When energized, relay 118 actuates armature spring 119 to close signal controlling contacts 119a and 119b. Closure of contact 119a transmits a signal tone from oscillator OSC through a keying apparatus K to the pilot's headphones H to give audible indications of passing over the marker beacon. Closure of contact 119b transmits current from the electrical power source 39 through a keyer K₁ to the flashing signal lamp L. Keyers K and K₁ interrupt their respective circuits in accordance with the code assigned to the signals of the particular marker beacon which is being simulated.

If desired, additional marker contacts similar to 114a may be provided on the contactor 93 along the circumferential path indicated to actuate additional headphone and signal lamp circuits, whereby providing simulation of a plurality of fan markers on a landing system.

The glide beam meter 88 and amplifier 89 together with its inputs shown in the upper portion of Fig. 9 corresponds to the like-numbered apparatus of Fig. 7. It is to be clearly understood that the indicator 88, of Fig. 9, may be combined with the course indicator 91, of Fig. 8, to provide a cross-pointer landing indicator having the appearance of conventional instruments of this character.

The foregoing description has been directed to the operation of the invention by direct current. The system is equally operable by alternating current, an arrangement for this purpose being described below.

*Alternating current operation*

When operation is to be by alternating current, the power sources 38 and 39 of Fig. 2 are to be taken as alternating current supplies each of opposite polarity to the other and hence of inverse phase relationship. Alternating current voltages having phase and potential as parameters varying in accordance with the position of the craft with respect to the landing point O will then appear at terminals 44 and 46, Fig. 2, respectively. When alternating current is employed, it will be apparent that two potentiometers, such as 14 and 19, are sufficient so that the potentiometers 15 and 20 and their associated contacts 13 and 18 can be eliminated.

Referring now to Fig. 10, the apparatus 96 is a rotatable synchronous transformer having fixed windings 97 and 98 which are in electrical quadrature relationship and are connected to terminals 44 and 46 respectively of Fig. 2. This apparatus is used in place of the D. C. resolver system of Fig. 2a. Accordingly, the winding 97 is energized by the longitude position voltage $\pm e_x$ and the winding 98 is energized by the latitude position voltage $\pm e_y$. It is to be noted that it is the instant potentials of these voltages which are the parameters that vary in accordance with the distance of the craft or trainer from the landing point O. The voltages $\pm e_x$ and $\pm e_y$ also are subject to a change in another parameter, namely phase, in accordance with reversal in the direction of the craft from the landing point O. Still other parameters of the alternating current voltages derived for the operation of the circuits herein described are the amperage in said circuits and the R. M. S. values of the currents and potentials.

Windings 99 and 100 are positioned at 90 electrical degrees with respect to each other and are conjointly rotatable with respect to the fixed windings 97 and 98. The relative position of the fixed and rotatable windings is such that they are mutually coupled magnetically and mutually adjustable by means of the shaft 101 which is turned by the dial 102 to any desired angle $\tau$ as indicated by the index 103 on the fixed compass card 104. By the action of the magnetic resolver 96 the voltage induced in winding 99 will be $e_x$ sine $\tau + e_y$ cosine $\tau = e_R$, and the voltage induced in the winding 100 will be $$e_x \text{ cosine } \tau - e_y \text{ sine } \tau = e_{lb}$$

Accordingly, the voltage $e_R$ having potential and phase parameters corresponding to the distance or range of the aircraft from the landing point O will appear at terminal 94. This voltage can be used to operate a suitable distance indicator as shown in Fig. 1. Similarly, the voltage $e_{lb}$ having instant and R. M. S. potential, and phase, as parameters representing the deviation of the aircraft or trainer from the direction of the landing localizer beam, will appear at terminal 95. This deviation voltage which is obtained from the resolving apparatus 96 according to the energization and azimuthal adjustment thereof, can be used to operate a meter or indicator 110 as described in connection with Fig. 12 to represent deviation from the localizer beam.

Means for operating the glide beam indicator are shown in Fig. 11 wherein terminal 94 connects to the like numbered terminal of Fig. 10 and is therefore energized by the range voltage $e_R$. A voltage $-e_h$, oppositely polarized to the normal value of $e_R$, is derived from potentiometer 85 which is energized from source 39 which in Fig. 11 is an alternating current supply. In other respects the altitude potentiometer 85 and other details of Fig. 11 function the same as like numbered items in Fig. 7. Phase and potential are parameters of the voltage $-e_h$, and these vary in accordance with the altitude of the aircraft with respect to the landing point O. The voltages $e_R$, and $-e_h$ are added together in the summing amplifier 105, the output of which is a voltage $e_{gb}$ which is impressed on the movable coil 108 of the dynamometer type on-course glide beam indicator 106. Pointer 109 is attached to and operated by the movable coil 108. The fixed winding 107 of said dynamometer indicator is energized by alternating voltage from source 39. Accordingly, any unbalance between the voltages $e_R$, and $-e_h$, corresponding to deviations from the on-course path of the glide beam, appear as an output voltage $e_{gb}$ which deflects the pointer 109 from the normal on-course zero position and signals the pilot that he is off-course.

Deviation from the direction of the landing localizer beam is indicated on the dynamometer type voltmeter 110, Fig. 12, having a pointer 111 attached to a movable coil 112. Terminal 95 of Fig. 12 is connected to terminal 95 of Fig. 10 and a voltage $e_{lb}$ having potential and phase as parameters varying with deviation of the craft or trainer from the direction $\tau$ of the localizer landing beam, is therefore impressed on the movable winding 112. The stationary coil 113 is energized by a voltage from source 39 which, when employed as in Fig. 12, is an alternating current supply. Accordingly, the localizer on-course meter 110 is deflected to the left or right as the flight deviates from the desired beam direction $\tau$.

It is to be understood that the glide and localizer beam indicating meters 106 and 110 of Figs. 11 and 12, respectively, may be combined in a single unit to appear as a conventional cross-pointer meter; or the potentials $e_{gb}$ and $e_{lb}$ may be placed on the vertical and horizontal plates of a cathode ray oscilloscope to give a pattern representing deviation in flight from the desired landing path.

*Alternating current system responsive to actual or simulated aircraft instruments*

For the purpose of applying the above described invention to an actual airplane or grounded training apparatus, use may be made of elements in said airplane or trainer responsive to air speed, heading and wind direction and velocity. Referring to the system illustrated by Fig. 13, shaft 120 is an element in a real or simulated air speed indicator moving in accordance with true air speed. Mounted on and insulated from the shaft 120 is a brush 121 engaging a potentiometer slide wire 122 which is energized by an alternating current voltage source 38. For the sake of brevity, alternating current circuits will hereinafter be used for illustrating the operation of the driving devices 1 and 6 of Fig. 2. It is to be understood, however, that my invention is not to be limited to the use of alternating current for this purpose because the apparatus may be adapted for operation by direct current by utilization of direct current resolvers of the character hereinbefore described, one form of which is shown in Fig. 3.

As will be obvious to those skilled in the art, the potentiometer slide wire 122 is only one means for deriving a voltage $e_{AS}$ proportional to air speed and that numerous other devices such as a variable auto-transformer of the type commercially known as a "Variac" may equally well be employed. Moreover, I contemplate also such variable voltage means as adjustable condensers, variometers, variocouplers, and photocells with their incident illumination varied by modulating slits or shaded masks moved by shaft 120. If necessary, torque amplifiers of well known form may be employed between the shaft 120 and the variable voltage means.

According to a feature of the circuit of Fig. 13 the air speed voltage $e_{AS}$ is resolved into two components, one representing the vertical component or rate of climb of the real or simulated craft, and the other, the horizontal air speed. This resolution is accomplished by the use of a rotary synchronous transformer 123, operating as a magnetic resolver, and having a single-phase winding 124 which is energized through slip rings 125 and 126, and brushes 127 and 128 by the voltage $e_{AS}$. The shaft 131 of said synchronous transformer 123, rotates the single-phase winding 124 thereof and is positioned by an operative connection, not shown, to an element of the craft moving in accordance with the angle of climb. If desired, the shaft 131 may be operatively connected for control by a gyroscope in an actual plane.

Winding 124 is magnetically coupled with and movable relative to the two-phase windings 129 and 130 into which are respectively induced the voltages $e_{AS}$ sine $\epsilon$ and $e_{AS}$ cosine $\epsilon$, where $\epsilon$ is the electrical angle between the single and two-phase windings and represents the angle of climb of said craft.

Responsive to the voltage $e_{AS}$ sine $\epsilon$ is an indicator 157 calibrated in terms of vertical air speed or rate of climb. Indicator 157 may be a dynamometer type voltmeter having a fixed coil 158 energized by an alternating current voltage source 38, and having a pivoted pointer 159 operable by a movable coil 160 which is energized by the voltage $e_{AS}$ sine $\epsilon$. The above voltages have potential and phase as parameters which vary with the angle $\epsilon$.

It is to be noted that $e_{AS}$ cosine $\epsilon$ is proportional to the horizontal component of air speed, herein designated $e_{hz}$. For reasons which are fully discussed in the next following paragraph, the voltage $e_{hz}$ is to be resolved into components along quadrature reference axes corresponding to reference axes 4 and 9, Fig. 1. This resolution is made in a rotary synchronous transformer 132 similar to transformer 123 above described. In the resolver 132, the single phase winding 133 is energized by the voltage $e_{hz}$ and is rotated by the orientation shaft 134 with respect to the fixed two-phase windings 135 and 136 according to the heading angle $\alpha$ of the real or simulated craft. For this rotation, said shaft 134 may be operatively connected to the shaft of a gyroscopic or magnetic compass with torque amplifier, or any other element of the craft moving according to the azimuthal heading of said craft.

An amplifier 137 is inserted in the circuit to minimize load variation in the preceding units of the circuit and is a linear amplifier having a high input impedance and low output impedance. Amplifiers of this type are well known in the art, and it is therefore not deemed necessary to describe such a device herein.

In addition to energizing the winding 133 of the resolver 132, the amplifier 137 may also be employed to operate an indicator 161 calibrated to show horizontal air speed. Indicator 161 may be a dynamometer type voltmeter having a fixed winding 162 energized by the alternating current source 38 and having a pivoted pointer 163 operable by a movable coil 164 energized by the output voltage $e_{hz}$ of said amplifier 137.

The voltage $e_{hz}$ sine $a$, induced in winding 136 as a result of the relative positioning of the coil 133 is proportional to the velocity of the craft in the reference direction for convenience designated $x$ and corresponding to the direction of reference axis 4, Fig. 2, and the voltage $e_{hz}$ cosine $a$ induced in winding 135 is proportional to the velocity of the craft in the direction designated $y$ and corresponding to the reference axis 9, Fig. 2. These voltages have potential and phase as parameters and vary according to the direction and velocity of the airplane both vertically and horizontally.

The resolution of the voltage $e_{hz}$ into voltages along quadrature axes is performed to provide a common reference system for all vectors. This is particularly desirable where the vectors vary independently from one another in their instant directions. An example of such independent variation is wind drift. Wind may vary in an entirely different manner from the velocity and heading of the airplane.

To derive voltages representing the components of velocity of wind along the selected quadrature reference axes, two potentiometers may be set in accordance with said velocity components and furnish the desired voltages. However, wind information is usually provided in terms of velocity and direction. Hence, it is more convenient to employ means such as a potentiometer 138, energized by the alternating current source 38, to derive a voltage $e_w$ proportional to wind velocity. For this purpose a brush 139, which is mounted on and insulated from shaft 140, is positioned by a dial knob 141 so that the knob index 142 is at the proper wind velocity value as indicated by its setting on the wind scale 143.

The wind velocity voltage $e_w$ is resolved into components along the above referred to axes $x$ and $y$, by the rotary synchronous transformer 144 which is similar to the transformer 123 previously described in detail. The single phase winding 145 of the transformer 144 is energized by voltage $e_w$ and is angularly adjustable with respect to the fixed two-phase windings 146 and 147, respectively, by shaft 148 having a hand wheel dial 149 and index 150. The handwheel is set to the wind direction $\beta$ indicated on the compass scale 151. The voltage $e_w$ sine $\beta$ induced in winding 146 as a result of the relative positioning of the winding 145 is proportional to the velocity of the wind in the reference direction above designated as $x$, and the voltage $e_w$ cosine $\beta$, induced in winding 147, is proportional to the velocity component of the wind in the direction above designated as $y$. These voltages have potential and phase as parameters which vary with the velocity and direction of the wind.

The course of the craft made with respect to the ground, is the resultant of the craft air speed and wind vectors. A feature of my invention is the combination of these vectors by the electrical summation of their representative voltage components as by means of the summing amplifiers 152 and 153 to give the voltages $e_x$ and $e_y$, respectively. One form of summing amplifier suitable for this purpose is shown in Fig. 4. The output voltages of the amplifiers 152 and 153 are connected respectively to driving means such as 1 and 6 of Fig. 2. These driving means may be two-phase motors.

Referring to Fig. 14, reference character 165 indicates diagrammatically the circuit connections of a two-phase motor suitable for use as the driving means 1 or 6 at Fig. 2. In the operation of the system, it is essential that the velocity of the driving means 1, Fig. 2, be directly proportional to the voltage $e_x$ corresponding to the sum of voltages $e_{hz}$ sine $a + e_w$ sine $\beta$, and that the velocity of the driving means 6 be directly proportional at all times to a voltage $e_y$ corresponding to the sum of the voltages $e_{hz}$ cosine $a + e_w$ cosine $\beta$. Such linear response of the driving means 1 and 6 may be accomplished by inverse feedback including driving an induction generator from each of said driving means. In Fig. 14 there is diagrammatically shown in combination, a driving motor 165, an induction generator 154 and a summing amplifier 167 having input connections 168, 169 and 170. The amplifiers 152 and 153 of Fig. 13 may be used in the manner of amplifier 167, Fig. 14, so as to obtain inverse feed-back control by means of generators (not shown) driven by the motors 1 and 6 respectively, with the corresponding connections indicated by related reference characters. One phase, 155, of the generator 154, is energized by the alternating current voltage source 38. The winding 156 of the other phase is connected back to the amplifier 167 and is polarized to provide a voltage which is instantaneously opposite to the voltage $e_x$ when associated with the driving means 1 and amplifier 152, and opposite to $e_y$ when associated with the driving means 6 and amplifier 153. Accordingly, the generator voltage provides an inverse feedback coulomb flow which modifies the output current and phase of the associated amplifier to operate the driving means at a speed directly proportional to all values of the input voltage impressed on said associated amplifier. Each such associated amplifier contains the necessary phase shifting networks to properly phase the input and output voltages in a manner well known in the art.

It is also a feature of this invention that the rate of climb voltage $e_{AS}$ sine $\epsilon$ may be impressed on an amplifier 171, as over lead 168c, to operate a motor 172 for the purpose about to be described. Coupled to motor 172 is a generator 173 for providing an inverse feedback voltage over lead 170c to amplifier 171 in a manner similar to that described for the apparatus of Fig. 14. The amplifier 171 in combination with the feedback generator 173 causes motor 172 to rotate at a speed and direction linearly proportional to the magnitude and phase of all values of the control input voltage $e_{AS}$ sine $\epsilon$. The output shaft 174 of motor 172 operates a reducer gear box 175 to position shaft 86' in accordance with the time integral of the voltage $e_{AS}$ sine $\epsilon$ and thereby positions said shaft in accordance with the altitude of the real or simulated flight. Shaft 86' may therefore be directly connected to the brush 87 of Figs. 7 and 11 of the altitude potentiometer 85 of said figures.

To indicate the position of a real or simulated craft maneuvering with respect to an area, objective or a landing point contained in said area, use may be made of lead-screw nuts 3 and 8, Fig. 2 to indicate the flight path of said craft. Referring to Fig. 15, the member 166 is a slotted bar attached to nut 3 in perpendicular relationship to lead screw 2. Member 176 is a slotted bar attached to nut 8 in perpendicular relationship to lead screw 7. Accordingly, the intersection of the longitudinal axes of the bars represents the point 24 on the chart 5 in Fig. 2. The two bars 166 and 176 are coacting and slidably mounted in their slots in a stylus 177 adapted for making a trace on chart 5. By means of this apparatus a continual indication or a record may be had of the path flown in said craft and in particular during blind landing procedure.

Other uses, advantages and modifications of my invention will occur to those skilled in the art in this type of apparatus without departing from the spirit of my invention, and no limitation thereof is intended, except as set forth in the appended claims.

I claim:

1. In grounded training apparatus for simulating the flight of an aircraft with respect to an objective located with respect to a reference coordinate system having three Cartesian coordinate reference axes for defining the instant position of said aircraft with respect to said objective, means for producing a plurality of voltages, means operable according to the simulated instant flight position for deriving therefrom three voltages each having a parameter varying respectively in accordance with the instant position of said aircraft with respect to a corresponding axis, means including voltage resolving means responsive to said voltages according to said parameters for indicating the position of said aircraft with respect to said objective and means for producing a voltage having a parameter representing wind drift for modifying the aforesaid voltage parameters.

2. In apparatus for simulating the flight of an aircraft with respect to a point included in a reference coordinate system for defining the instant position of said aircraft with respect to said point, said system comprising a pair of coordinate reference axes, a pair of motive means operable respectively in speed and direction according to the component velocities of said craft along said reference axes, electrical means operable by said motive means respectively for deriving voltages corresponding respectively to the position coordinates of said aircraft with respect to said point, means including a resolver energized by said position coordinate voltages and having a movable element adjustable according to a predetermined azimuth angle corresponding to the desired azimuth of approach of said aircraft to said point for deriving voltages varying with the distance of the aircraft from said point and with the angular deviation of said craft from said azimuth approach angle, and individual means separately responsive to said distance and deviation voltages respectively for indicating the instant values of said distance and deviation.

3. In apparatus for simulating the flight of an aircraft with respect to a point included in a reference coordinate system for defining the instant position of said aircraft with respect to said point, said system comprising a pair of coordinate reference axes, a pair of motive means operable respectively in speed and direction according to the component velocities of said craft along said reference axes, variable voltage means driven by said motive means respectively for deriving voltages corresponding to the position coordinates of said aircraft with respect to said point, means energized by said position coordinate voltages and adjustable to a predetermined azimuth angle corresponding to the desired azimuth of approach to said point for deriving a first voltage varying with the distance of said craft from said point and a second voltage varying with the azimuthal angular deviation of said craft from said approach angle, a device responsive to said distance and deviation voltages for indicating the instant values of said distance and deviation, electrical means for deriving voltages corresponding to wind drift along said coordinate axes, and means for modifying the operation of said motive means in accordance with said wind drift voltages to introduce the effects of wind drift.

4. The combination in apparatus for simulating the movement of a craft with respect to a point included in a reference coordinate system for defining the instant position of said craft with respect to said point, said system comprising a pair of coordinate reference axes, a pair of motive means operating respectively in speed and direction according to the component velocities of said craft along said reference axes, electrical means driven by said motive means respectively for deriving voltages corresponding to the position coordinates of said craft with respect to said point, means including a resolver energized by said position coordinate voltages and having a movable element adjustable according to a predetermined azimuth angle corresponding to the desired azimuth of approach to said point for deriving a voltage varying with the distance of said craft from said point and means responsive to said distance voltage for indicating the instant value of said distance.

5. The combination in apparatus for simulating the movement of a craft with respect to a point included in a reference coordinate system for defining the instant position of said craft with respect to said point, said system comprising a pair of coordinate reference axes, a pair of motive means operating respectively in speed and direction according to the component velocities of said craft along said reference axes, electrical means driven by said motive means respectively for deriving voltages corresponding to position coordinates of said craft with respect to said point, means including a resolver energized by said position coordinate voltages and having a movable element adjustable according to a predetermined azimuth angle corresponding to the desired azimuth of approach to said point for obtaining a voltage varying with the azimuthal angular deviation of said craft from said approach and means responsive to said deviation voltage for indicating the instant value of said deviation.

6. In apparatus adapted to simulate the movement of a craft with respect to a radio localizer beam directing said craft to an objective included in a pair of reference Cartesian coordinate axes for defining the instant position of said craft with respect to said objective, a pair of motive means operating respectively in speed and direction according to the components of velocity of said craft with respect to said reference axes, a source of voltage, variable electrical means connected to said source and operated by said motive means respectively for deriving a pair of coordinate voltages each having a parameter varying with the instant distance of said craft from said axes, means having a movable element adjustable in determination of the azimuth angle representing a localizer beam and energized by said coordinate voltages in accordance with the parameters thereof for deriving a voltage having a parameter varying with the deviation of said craft from said azimuth angle and an indicator responsive to said deviation voltage for indicating the deviation from said azimuth angle.

7. In grounded apparatus adapted to simulate the flight of an aircraft with respect to a radio glide beam for directing said aircraft to an objective, a reference coordinate system to which said objective is referred for defining the instant position of said aircraft with respect to said objective, said system comprising two mutually perpendicular references axes $x$ and $y$, and an altitude reference axis, a pair of motive means operating respectively in speed and direction according to the components of velocity of said aircraft parallel to said axes $x$ and $y$, a source of voltage, variable electrical means connected to said source and operated by said motive means respectively for deriving a pair of voltages each having a parameter varying in accordance with the distance of said craft from said axes $y$ and $x$ respectively, means energized by said pair of voltages in accordance with their parameters and adjustable to simulate the azimuth of approach of said aircraft to said objective for deriving a voltage having a parameter corresponding to the vector resultant of said $y$ and $x$ voltage parameters, means operable according to the simulated altitude, and means responsive to said altitude means for deriving a voltage having a parameter corresponding to the distance of said flight above said objective in the direction of said altitude axis, and means responsive to said resultant and altitude voltages for indicating the deviation of said aircraft from a path representing said glide beam.

8. Apparatus according to claim 7 including electrical means for resolving wind velocity into voltage components along said reference axes, and means for modifying the operation of said motive means according to the voltage components of wind velocity along each of said reference axes $x$ and $y$ to introduce the effects of wind drift.

9. In grounded apparatus for simulating the flight of an aircraft with respect to radio glide, localizer and marker beams for directing said aircraft to an objective, a reference coordinate system to which said objective is referred for defining the instant position of said craft with respect to said objective, said system comprising two mutually perpendicular reference axes $x$ and $y$, and an altitude reference axis, a pair of power devices each operating in speed and direction according to the components of velocity of said aircraft with respect to said axes $x$ and $y$, a flight path indicating element operable by said power devices for charting the path of said flight, a source of voltage, a pair of variable electrical means each connected to said source and operated by said power devices respectively for deriving a pair of voltages representing the distances of said craft with respect to said axes $x$ and $y$, means energized according to said pair of voltages and adjustable in determination of the azimuth angle of said localizer beam for deriving a first voltage proportional to range distance from said objective and a second voltage varying with the deflection of the instant position of aircraft from the localizer beam, an element movable in accordance with the simulated altitude of said aircraft with respect to said objective, variable electrical means energized from said power source and responsive to the movement of said element for deriving a voltage corresponding to said simulated altitude, means responsive to said range and altitude voltages for indicating the deviation of said aircraft from said glide beam, means responsive to said deflection voltage for indicating the deviation of said aircraft from said localizer beam, and means responsive to a predetermined value of said range voltage for producing signals simulating those received in an aircraft during flight over a fan marker.

10. In an aircraft adapted for simulating maneuvering with respect to radio glide and azimuthally directed localizer beams for directing said aircraft to an objective, apparatus comprising a pair of power devices each operating in speed and direction according to the components of velocity of said aircraft with respect to mutually perpendicular axes $x$ and $y$ associated with said objective, a flight path indicating element operable by said power devices for charting the path of said flight, means operated by said power devices for deriving a pair of voltages representing the distances of said craft from said axes $x$ and $y$, means energized according to said pair of voltages and adjustable in determination of the azimuth angle of said localizer beam for deriving a first voltage proportional to the range distance from said objective and a second voltage varying with the deflection of the instant position of said aircraft from the localizer beam, an element in said aircraft movable in accordance with altitude and electrical means responsive to the movement of said element for deriving a voltage corresponding to said altitude, means responsive to said range and altitude voltages for operating a glide beam indicator, and means responsive to said deflection voltage for operating a localizer beam indicator.

11. Aviation training apparatus for simulating and indicating positional changes of both real and simulated flight with respect to an azimuthally directed or localizer beam and a vertically inclined or glide beam comprising a reference Cartesian coordinate system having $x$ and $y$ axes and an altitude axis with respect to which said positional changes may be defined by Cartesian coordinates $x$ and $y$, and an altitude coordinate, three elements each movable according to a corresponding coordinate, a source of voltage, three variable electrical means each operatively connected to said voltage source, said elements adapted for deriving voltages representing respectively said corresponding coordinates, means adjustable in accordance with the direction of the azimuthally directed beam and energized by the derived voltages representing the coordinates $x$ and $y$ adapted for deriving a first voltage varying with the deviation of said flight from said azimuthally directed beam and a second voltage varying with the positional changes of said flight along said beams, means responsive to said second derived voltage and the derived voltage representing altitude for operating a glide beam indicator, and means responsive to said first voltage for operating a localizer beam indicator.

12. Apparatus according to claim 11 in which the azimuthal adjustable means is an electromagnetic device having mutually rotatable and inductively coupled input polyphase and output polyphase windings, said input windings being energized by the derived x and y voltages and said output windings providing said first and said second derived voltages.

13. Training apparatus for simulating the flight of an aircraft with respect to directional glide and localizer beams arranged to direct such aircraft to an objective comprising an element movable to represent the speed of said flight, a second element movable to represent the instant direction of said flight, and a third element movable to represent the instant altitude of said flight, means responsive to said speed element for deriving a voltage representing said speed, resolving means energized by said speed voltage and actuated by said direction element for deriving voltages representing respectively the velocity of said aircraft with respect to a pair of reference coordinate axes, a pair of power means responsive respectively in speed and direction to said velocity voltages, variable electrical means responsive respectively to said power means for deriving additional voltages representing respectively the position of said aircraft relative to said reference coordinate axes, means adjustable relative to the direction of said localizer beam and energized by said additional voltages for deriving a voltage varying with the instant distance of said aircraft from said objective and for deriving another voltage varying with the deflection of said flight from said localizer beam, means responsive to said altitude element for deriving a voltage representing altitude, means responsive to the derived deflection voltage for indicating deviation from said localizer beam and means responsive conjointly to said derived distance and altitude voltages for indicating deviation from said glide beam.

14. Apparatus according to claim 13 including means for modifying the operation of said training apparatus to include the effects of wind drift, said modifying means comprising means for deriving a voltage proportional to wind velocity, means energized by said wind velocity voltage and adjusted according to the direction of said wind for deriving a pair of voltages representing respectively the velocity of said wind with respect to each of said Cartesian coordinate reference axes, and means for combining corresponding aircraft and wind velocity components to produce resultant voltages for operating said power means in accordance with the combined effect of the aircraft and wind velocities.

15. Apparatus according to claim 13 wherein each power means includes means for deriving an inverse feedback current flow proportional to the rotation of said device, means having an output circuit connected to and operating said power means and having an input circuit responsive to one of said derived velocity voltages and to said feedback current for linearizing the velocity response of said power means with respect to said velocity input voltage.

16. In apparatus adapted to simulate the flight of an aircraft with respect to a radio glide beam directing said aircraft to an objective, a reference Cartesian coordinate system having a pair of axes to which said objective is referred for defining the instant position of said aircraft with respect to said objective, a pair of means operating respectively in speed and direction according to the components respectively of velocity of said aircraft with respect to said reference axes, means respectively responsive to said first-named means for deriving voltages having parameters varying respectively with the instant distance of said aircraft from a corresponding axis, means adjustable corresponding to the azimuth of approach of said aircraft to said objective and energized by said coordinate voltages in accordance with the parameters thereof for deriving a voltage having a parameter varying with the instant range of said aircraft from said objective, means operable according to the simulated flight altitude for deriving a voltage having a parameter proportional to the flight altitude, and indicating means responsive to the parameter of said derived range voltage and the parameter of said derived altitude voltage for indicating deviations in the flight of said aircraft from said glide beam.

17. Apparatus according to claim 16 in which the means adjustable to the azimuth of approach comprises electromagnetic means having input and output windings rotatable with respect to each other in accordance with said azimuth of approach, said input winding comprising a polyphase winding energized according to the parameters of the derived voltages representing distance of the aircraft from said axes, and said output winding being inductively coupled with said input polyphase winding for deriving the voltage having a parameter varying in accordance with range.

18. In apparatus for simulating the movement of a craft with respect to a fan marker, means for actuating a fan marker indicator at a predetermined distance from a reference point comprising means for deriving a pair of voltages each having a parameter varying in accordance with the instant distance of said craft from a pair of reference Cartesian coordinate axes, means responsive to the parameters of said voltages and adjustable to the direction of said marker from said point for deriving a voltage having a parameter varying with the instant range of said craft from said point, a source of signals simulating fan marker signals, an indicating receiver for the signals, and means responsive to said range voltage parameter for operating the receiver from said source at a predetermined value of said range parameter.

19. Training apparatus for simulating the flight of an aircraft with respect to an objective having radio glide and localizer beams comprising a reference coordinate system having three coordinate reference axes, two individually energized motive means each operable according to the simulated instant flight position to move an element so as to represent the instant position of said aircraft with reference to a corresponding axis, means for producing a plurality of voltages, means associated with said elements respectively for deriving therefrom voltages representing an instant two-coordinate position of said aircraft in said reference system, resolving means energized by said voltages and adjustable in accordance with the direction bearing of said beams for producing a plurality of control voltages, means for deriving a voltage corresponding to the instant altitude coordinate position of said aircraft, indicating means responsive to the resultant of two of said control voltages for representing the flight deviation from said localizer beam, and indicating means responsive to the resultant of three of said control voltages including the altitude voltage for representing the flight deviation from said glide beam.

20. Flight training apparatus for simulating blind landing maneuvers with respect to an objective having both glide and localizer directing beams, said objective being located in a reference system having a pair of reference Cartesian coordinate axes, comprising means controlled in accordance with the simualted flight position for deriving voltages corresponding in magnitude to the position values of the flight along said coordinate axes respectively, resolving means energized by said derived voltages and adjustable according to the desired angle of approach on said localizer beam for producing a plurality of control voltages, means energized by certain of said control voltages for indicating deviation from said localizer beam, means controlled in accordance with the simulated altitude of said flight for producing an altitude voltage, and means jointly controlled by said altitude voltage and certain of said control voltages for indicating deviation of the flight position from said glide beam.

21. Flight training apparatus for simulating blind landing maneuvers with respect to an objective having both glide and localizer directing beams, said objective being located in a reference system having a pair of reference Cartesian coordinate axes, comprising means controlled in accordance with the simulated flight position for deriving voltages corresponding in magnitude to the position values of the flight along said coordinate axes respectively, resolving means energized by said derived voltages and adjustable according to the desired angle of approach on said localizer beam for producing a plurality of control voltages, means energized by certain of said control voltages for indicating the range distance from said flight position to said objective, means energized by certain of said control voltages for indicating deviation from said localizer beam, means controlled in accordance with the simulated altitude of said flight for producing an altitude voltage, and means jointly controlled by said altitude voltage and certain of said control voltages for indicating deviation of the flight position from said glide beam.

22. In training apparatus for simulating the flight of an aircraft with respect to an objective located with respect to a reference coordinate system having three Cartesian coordinate reference axes for defining the instant position of said aircraft with respect to said objective, means operable according to the simulated flight position for producing three voltages each varying respectively in accordance with the instant position of said aircraft with respect to a corresponding axis, resolving means energized by two of said voltages and adjustable according to the desired azimuthal angle of approach to said objective, and means jointly responsive to said resolving means and the third voltage for indicating the position of said aircraft with respect to said objective.

23. In training apparatus for simulating the flight of an aircraft with respect to an objective located with respect to a reference coordinate system having three Cartesian coordinate reference axes for defining the instant position of said aircraft with respect to said objective, means operable according to the simulated instant flight position for producing two voltages, each varying respectively according to the instant position of said aircraft with respect to a corresponding axis whereby the resultant of said voltages represents horizontal distance from said instant position to said objective, means for modifying said distance voltages according to the desired azimuth angle of approach to said objective, means operable according to simulated altitude of the instant flight position for producing a third voltage opposite in polarity to the aforesaid resultant, electrical summing means for said altitude and modified distance voltages, and means representing a glide beam indicator responsive to said summing means.

24. In training apparatus for simulating the flight of an aircraft with respect to an objective located with respect to a reference coordinate system having Cartesian coordinate reference axes X and Y for defining the instant position of said aircraft with respect to said objective, means operable according to the simulated instant flight position for producing two voltages $e_x$ and $e_y$, each varying respectively as to polarity and magnitude according to the instant position of said aircraft with respect to a corresponding X and Y axis, resolving means energized by said voltages $e_x$ and $e_y$ and adjustable according to the desired azimuth approach angle $\tau$ to said objective for producing azimuth control voltages $e_x \cos \tau$ and $-e_y \sin \tau$ representing angular deviation from the desired approach angle, whereby the algebraic sum of said voltages is zero when the aircraft is represented as being "on-course," electrical summing means for said azimuth voltages, and means representing a localizer beam indicator responsive to said summing means.

25. In training apparatus for simulating the flight of an aircraft with respect to an objective having glide and localizer beams located with respect to a reference coordinate system having three Cartesian coordinate reference axes for defining the instant position of said aircraft with respect to said objective, means operable according to the simulated flight for representing rate of aircraft movement along each axis, integrating means responsive to said rate means for producing three voltages, each varying respectively according to the instant position of said aircraft with respect to a corresponding axis, resolving means energized by two of said voltages and having a movable element that is adjustable according to the desired angle of approach in azimuth to said objective, an indicator representing a localizer beam indicator responsive to said resolving means and a second indicator representing a glide beam indicator jointly responsive to said resolving means and the third voltage.

26. In training apparatus for simulating the flight of an aircraft with respect to an objective having glide and localizer beams located with respect to a reference coordinate system having three Cartesian coordinate reference axes for defining the instant position of said aircraft with respect to said objective, means operable according to the simulated flight for representing rate of aircraft movement along each axis, integrating means responsive to said rate means for deriving three voltages, each varying respectively according to the instant position of said aircraft with respect to a corresponding axis, means for combining and modifying said voltages for producing a plurality of indicator control voltages, said combining and modifying means including resolving means having a movable element adjustable according to a predetermined azimuth angle defining the approach path of the aircraft to said objective, and simulated position indicating means responsive to said control voltages for representing respectively deviations of the instant flight position from said glide and localizer beams.

27. Flight training apparatus for simulating blind landing maneuvers with respect to an objective having a radio direction beam, said objective being located in a reference system defined by a pair of Cartesian coordinate axes, comprising voltage deriving and resolving means for producing velocity voltages representing ground speed of the simulated flight along said reference axes respectively according to simulated air speed and wind drift, integrating means energized respectively by said velocity voltages, voltage deriving means controlled by said integrating means for producing coordinate position voltages for representing the instant flight position in said reference system, voltage resolving means energized by said position voltages and adjustable according to the direction of said radio beam, and indicating means responsive to voltage output of said resolving means for representing the flight position with respect to said direction beam.

28. Flight training apparatus for simulating blind landing maneuvers with respect to an objective having both glide and localizer directing beams, said objective being located in a reference system defined by a pair of Cartesian coordinate axes, comprising voltage deriving and resolving means for producing velocity voltages representing ground speed of the simulated flight along said reference axes respectively according to simulated air speed and wind drift, integrating means energized respectively by said velocity voltages, voltage deriving means controlled by said integrating means for producing coordinate position voltages for representing the instant flight position in said reference system, voltage resolving means energized by said position voltages and adjustable according to the direction of said localizer beam, indicating means responsive to voltage output of said resolving means for representing the flight position with respect to said localizer beam, voltage deriving means adjustable according to simulated flight altitude, and indicating means responsive jointly to voltage output of said resolving means and said altitude deriving means for representing the flight position with respect to said glide beam.

29. Flight training apparatus for simulating blind landing maneuvers with respect to an objective having both glide and localizer directing beams, said objective being located in a reference system defined by a pair of Cartesian coordinate axes, comprising voltage deriving and resolving means for producing velocity voltages representing ground speed of the simulated flight along said reference axes respectively according to simulated air speed and wind drift, integrating means energized respectively by said velocity voltages, voltage deriving means controlled by said integrating means for producing coordinate position voltages for representing the instant flight position in said reference system, means including a voltage resolver energized by said position voltages and having an element angularly adjustable in azimuth according to the direction of said localizer beam, indicating means responsive to voltage output of said resolver for representing the flight position with respect to said localizer beam, voltage deriving means adjustable according to simulated flight altitude, and indicating means responsive jointly to voltage output of said resolver and said altitude deriving means for representing the flight position with respect to said glide beam.

30. Flight training apparatus for simulating blind landing maneuvers with respect to an objective having a radio direction beam, said objective being located in a reference system defined by a pair of Cartesian coordinate axes, comprising rate means operable according to the simulated flight for representing the respective rate of aircraft movement along each axis, integrating means responsive to said rate means, voltage deriving means controlled by said integrating means for producing coordinate position voltages for representing the instant flight position in said reference system, voltage resolving means energized by said position voltages and adjustable according to the direction of said radio beam, and indicating means responsive to voltage output of said resolving means for representing the flight position with respect to said direction beam.

RICHARD C. DEHMEL.

REFERENCES CITED

The following references are of record in the file of this patent:

UNITED STATES PATENTS

| Number | Name | Date |
|---|---|---|
| 1,985,265 | Smith | Dec. 25, 1934 |
| 1,985,266 | Smith | Dec. 25, 1934 |
| 2,003,933 | Greig | June 4, 1935 |
| 2,066,949 | Ruiz | Jan. 5, 1937 |
| 2,070,178 | Pottenger | Feb. 9, 1937 |
| 2,080,186 | Reymond | May 11, 1937 |
| 2,099,857 | Link | Nov. 23, 1937 |
| 2,124,684 | Behr | July 26, 1938 |
| 2,150,006 | Parker | Mar. 7, 1939 |
| 2,155,346 | Davis | Apr. 18, 1939 |
| 2,164,412 | Koster | July 4, 1939 |
| 2,226,726 | Kramer | Dec. 31, 1940 |
| 2,240,800 | Rigert | May 6, 1941 |
| 2,326,764 | Crane | Aug. 17, 1943 |
| 2,332,523 | Norden | Oct. 26, 1943 |
| 2,338,536 | Carcasson | Jan. 4, 1944 |
| 2,366,603 | Dehmel | Jan. 2, 1945 |
| 2,385,095 | McCarthy | Sept. 18, 1945 |
| 2,389,359 | Grow | Nov. 20, 1945 |
| 2,406,836 | Holden | Sept. 3, 1946 |
| 2,408,081 | Lovell | Sept. 24, 1946 |
| 2,416,363 | Wellings | Feb. 25, 1947 |
| 2,448,544 | Muller | Sept. 7, 1948 |
| 2,465,624 | Agins | Mar. 29, 1949 |

FOREIGN PATENTS

| Number | Country | Date |
|---|---|---|
| 458,274 | Great Britain | 1936 |
| 540,736 | Great Britain | 1941 |
| 852,687 | France | 1939 |